United States Patent Office 2,777,254
Patented Jan. 15, 1957

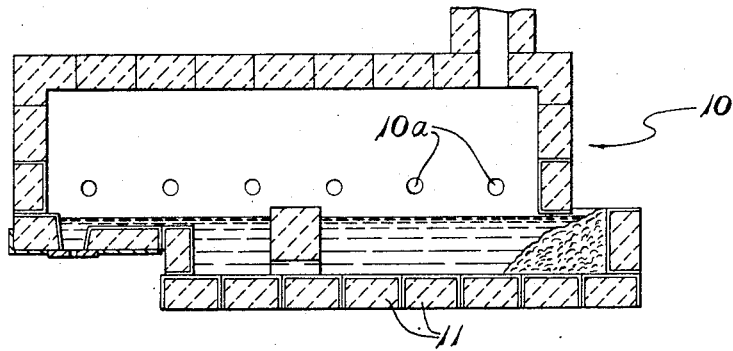
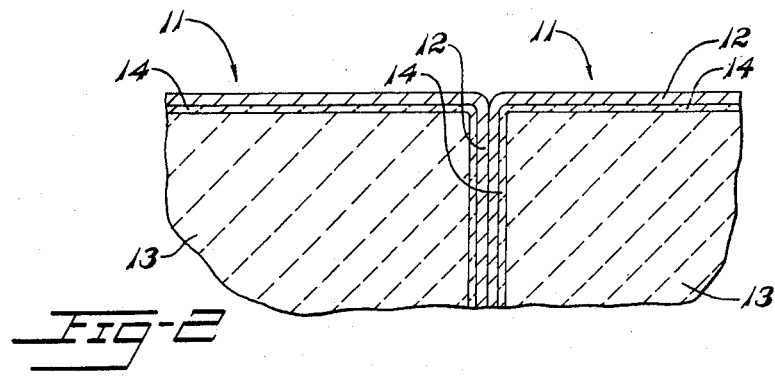
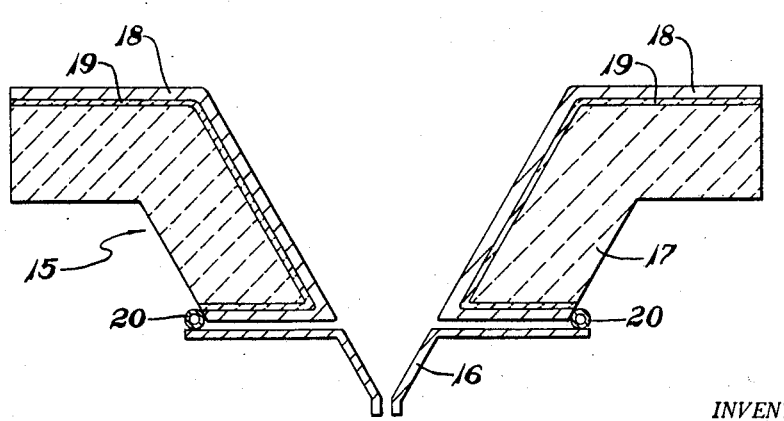
INVENTORS
August C. Siefert
Robert J. Cunningham

2,777,254

COATED REFRACTORY FOR CONTACTING MOLTEN GLASS AND METHOD OF MAKING SAME

August C. Siefert and Robert J. Cunningham, Newark, Ohio, assignors to Owens-Corning Fiberglas Corporation, Toledo, Ohio, a corporation of Delaware Application October 22, 1952, Serial No. 316,282

7 Claims. (Cl. 49—81)

This invention relates to improved refractory materials for feeders, tanks and the like, and particularly to coated refractory materials suitable for contacting molten glass.

One ever present problem in the glass industry manifests itself in the harmful corrosive action resulting from molten glass contacting the refractory surface of glass handling apparatus. The destructive physical attack evidenced by washing away of the refractory material in glass handling apparatus and the corrosive chemical attack evidenced by the wearing away of furnace walls due to the reaction between the molten glass and the refractory at the glass surface within a melting furnace adversely affect the quality of the glass.

For instance, in the operation of a glass melting furnace, the level of the glass within the furnace will vary causing the refractory wall to wear away. Some of the refractory which leaves the wall of the furnace goes into solution forming cords in the glass. Also some of the refractory breaks away from the refractory wall in the form of small stones in the glass. These cords and stones in molten glass are particularly harmful when the glass is to be formed into fibers, since non-uniformity in the molten glass results in discontinuity in the fiber forming operations. Likewise the passage of molten glass through the orifices of a feeder causes the diameter of the orifices to increase due to wear.

Parts made of platinum and platinum alloys have been used in the past to replace refractory members at points of most severe attack on the surfaces of the glass handling apparatus. This procedure has been found to be unsatisfactory for general use due to the physical properties of platinum including its inherent softness which make it necessary to make such installations with relatively heavy and very expensive wall sections.

It is an object of this invention to provide improved apparatus for handling molten glass.

It is also an object to provide such apparatus for producing molten glass and fibrous products therefrom of the highest quality.

It is a further object to reduce contamination of glass, melted in a furnace, by stones and cords of refractory.

It is a further object to prolong the life of refractory blocks which are used to contact molten glass.

Another object is to provide novel methods of applying a protective coat to refractory blocks and other glass handling apparatus.

Other objects will be apparent from the description which follows.

In the drawings:

Fig. 1 is a longitudinal sectional view of a glass melting furnace;

Fig. 2 is an enlarged fragmentary sectional view of adjacent refractory blocks coated with a protective coating; and Fig. 3 is a sectional view of a bushing or feeder having parts comprising coated refractory blocks.

The objects of the invention are attained by securing a thin foil of a metal, including those metals and alloys of metals which are suitable for contacting molten glass and including platinum and its alloys, upon the surface of a conventional refractory material. This foil covered refractory material is then used to construct glass handling apparatus such as glass melting tanks, stirring apparatus, feeders, and the like.

The materials so formed are used to make the products illustrated in Figs. 1 to 3 inclusive. In Fig. 1 a gas-fired glass melting furnace is shown. This furnace comprises walls and floor lined with refractory blocks of this invention and a superstructure of conventional aluminum silicate refractory block. In the walls of said furnace are gas burner ports 10a, 10a. The furnace 10 comprises refractory blocks 11 which have the glass contacting face covered with platinum foil 12, see Fig. 2. This platinum foil 12 is adhered to the refractory material 13 by an aluminum zirconium silicate glass bond 14.

In producing refractory blocks such as those shown in Figs. 1 and 2, a refractory block of zirconium silicate 13 is coated with a thin layer of alumina which is dusted upon the refractory surface. Next the alumina is covered with a foil of platinum 12 and the composite structure is weighted by placing blocks of refractory or other heat resistant material over the platinum foil. The structure is fired at a temperature of 3030° F. for a sufficient length of time to cause a reaction between the alumina and the refractory block of zirconium silicate. The reaction product, upon cooling, forms a strong glass 14 which bonds the platinum foil 12 to the zirconium silicate refractory 13.

The resultant glass is believed to be an aluminum zirconium silicate glass which forms a thin bonding layer between the foil and the refractory, some of the glass having flowed into the pores of the refractory. The refractory used to exert pressure upon the foil is removed after the product has cooled and a foil covered refractory block is the final product. If so desired, only one face and the immediately adjacent portions of adjacent faces of the block are covered as shown in Fig. 2. The refractory blocks so made are very resistant to wear and are assembled in the conventional manner to build the floor and walls of a furnace. The foil facing adheres tightly to the refractory block and provides a means of reducing contamination of the glass by the refractory.

When desirable in order to produce extra high quality glass, the superstructure of the tank is also lined with the foil covered refractory block. By such an expedient, it is almost certain that no contamination of the glass can occur, since all surfaces within the tank are lined with a platinum foil.

In Fig. 3 is shown a feeder or a bushing 15 comprising a platinum alloy member 16 in which the orifice is formed and an upper member which comprises a refractory member 17 covered with a 90:10 platinum rhodium foil 18 bonded thereto by a glass layer 19. Such a construction reduces substantially the platinum requirements in the production of feeders for handling molten glass. The lower platinum alloy member 16 is adapted for passing electrical current therethrough in order heat the orifice outlet. The remainder of the bushing is made of refractory material that is faced with platinum rhodium foil which resists the attack of molten glass passing thereover. Such a feeder is produced as follows, see Fig. 3. A molded zirconium silicate refractory member 17 is coated with a water suspension comprising a clay having 30% alumina by weight which can be brushed on the refractory. After the suspension is brushed upon the face of refractory member 17 and allowed to dry, the platinum rhodium foil 18 is placed over the dried deposit of clay and the composite article is fired at 2700° F. for a sufficient length of time to form a glass bond 19 between the platinum rhodium foil 18 and the refractory 17. This glass bond is believed to be an aluminum zirconium silicate glass.

The coated refractory member is combined with a platinum alloy member 16 which contains an orifice through which molten glass flows. A cooling coil 20 is used to solidify the glass which tends to flow outwardly between the flanges of member 16 and the coated refractory block. The metallic member 16 is adapted to be electrically heated and is used as a resistance element in the electrical circuit provided to maintain the glass at a temperature at which it will flow freely. The bushing shown in Fig. 3 is adapted to be used in conjunction with any melting tank capable of delivering molten glass for formation into fibers.

In another embodiment of the invention an unfired zirconium silicate refractory member is coated wtih a mixture comprising alumina powder with enough vaseline to form a paste. Over this paste, which comprises a suspension of alumina in vaseline, is placed a platinum foil which is smoothed and pressed into contact with the alumina. This composite product is then fired at 3000° F., in order to fire the zirconium silicate refractory member and also to form a glass bond between the fired refractory member and the platinum foil.

There is a great advantage in firing the refractory member and forming the glass bond in one heating step both from an economic standpoint and from a practical standpoint.

The bonding materials may be any suitable ceramic material such as alumina or one or more of the clays or clay-like materials. When alumina containing clays are used the temperature at which the composite structure is treated in order to form a glass bond is from about 2500° to about 2800° F. The alumina content of the clays to be used may vary from about 18 to about 43% by weight.

When using alumina either in the form of a powder or in the form of a slip, temperatures of from 2800° F. to 3100° F. may be used to effect a bond between platinum foil and zirconium silicate refractory.

Other like materials may be used as the bonding agent if they provide the following properties:

(a) Reaction product with base refractory must partially fuse below the melting point of the foil.

(b) Must react with the refractory to form a glass that is not so low in viscosity as to disappear completely into the pores of the refractory or so viscous as not to flow between the surface of the platinum foil and the refractory within a reasonable firing time.

(c) Must wet the surface of the foil.

(d) Must retain its bonding characteristics at the operating temperature of the glass handling apparatus of which it is a part.

For instance such materials as feldspar, clays, Portland cement and others may be used.

The bonding material is applied either as a powder or in the form of a suspension comprising one or more of the above described bonding agents and a vehicle such as water, vaseline, methyl alcohol, toluene, silica gel and the like. A suspension in water is generally referred to as a slip while suspensions of a bonding material such as alumina in vaseline are in the nature of paste.

A refractory material as the term is used herein connotes any material that is slow to melt and resists the action of heat. Other refractory materials besides zirconium silicate refractory may be used. Such materials as aluminum silicate, aluminum oxide, zirconium oxide, and the like, and including chromium containing refractories may be used. It has been found that either green or fired zirconium silicate may be coated according to the methods of the invention. When a green refractory is used, the refractory is fired at the same temperatures and at the same time that the bonding material is fused. Obviously there is an economic advantage in firing and bonding in one heating step. Any refractory which can be molded or otherwise formed into the desired forms as illustrated in the drawings may be used.

The thickness of the platinum or other metallic foil may vary from about .0005 of an inch to about .0020 of an inch or more. It will be manifest that the foil thickness is actually limited in the lower limits by limitations such as the practicability of manufacturing and handling such foil. The upper limit of thickness is, of course, controlled not only by handleability characteristics, but by the factor of economics. It is desirable to use a foil of no greater thickness than is necessary to resist the wear and corrosive action which is expected in use. Any foil, which is ductile, substantially hole-free and will resist the corrosive action of molten glass, may be used. A foil of a precious metal such as platinum and alloys of metals including those of platinum, iridium, gold, palladium, nickel, rhodium, and the like, having the above properties, may be used. Platinum alloys such as those disclosed in Weller 2,031,083 and Vilensky 2,361,578 are examples of those well adapted for the purposes of this invention.

It will be noted that in describing the method of making a feeder, no pressure is exerted upon the foil covered article while it is fired. It has been discovered that it is not essential to use pressure means in order to obtain a good bond between the foil and refractory block. The weight of the foil itself is sometimes sufficient to give a strongly bonded final product. The final bonding layer is relatively thin as compared to the foil thickness, since a part of the glass formed by the chemical reaction between the alumina and the refractory flows into the pores of the refractory block providing a lock therewith. The reaction product of the alumina and refractory should melt at a temperature lower than the melting point of the foil.

The materials of this invention allow great savings in platinum in making glass handling apparatus. However, in addition to this important factor, the constructions provide very strong members having the good physical characteristics of resistance to molten glass and resistance to change in dimensions. It is to be emphasized that the molten glass resistant foil is secured throughout its extent to the underlying refractory member. Such a construction allows the member to be used in vertical wall positions or in horizontal positions with the foil either being on the bottom of the refractory or on the top surface of the refractory. Furthermore, such a construction provides great resistance to forces which tend to change the relative positions of the foil and the underlying refractory.

By using melting furnaces comprising the refractory blocks of this invention it is possible to produce cord and stone-free glass of the highest quality which is particularly suited for producing fibrous glass.

Although specific embodiments of the invention have been disclosed it is not intended to be limited thereto, but rather to include obvious variations and modifications within the spirit and scope of the following claims.

We claim:

1. A method of producing a refractory member consisting essentially of depositing upon a zirconium silicate member a layer comprising alumina, spreading over said layer comprising alumina a foil of platinum, pressing said foil of platinum against said layer comprising alumina and heating the composite product to from about 2500° to 2800° F., for a sufficient length of time to cause the alumina to react with said zirconium silicate member and form a bond of aluminum zirconium silicate glass between said foil of platinum and said zirconium silicate member.

2. In glass handling apparatus, a refractory member comprising a block of zirconium silicate, over at least one face thereof a layer of precious metal, and between said zirconium silicate and layer of precious metal a reaction product of said zirconium silicate and alumina, said reaction product bonding said layer of precious metal to said block of zirconium silicate.

3. The refractory member of claim 2 wherein said block of zirconium silicate is porous and wherein at least a part of said reaction product flows into the pores of said block of zirconium silicate to lock therewith.

4. The refractory member of claim 2 wherein said layer of precious metal is platinum alloy.

5. A feeder for producing fibrous glass comprising a refractory member consisting essentially of a zirconium silicate member, over at least one face of said zirconium silicate member a layer of a precious metal alloy, and between said zirconium silicate member and said layer of precious metal alloy and adhering them one to the other, a reaction product of said zirconium silicate and alumina.

6. The feeder of claim 5 wherein said precious metal alloy is an alloy of platinum.

7. A refractory block suitable for building walls of glass melting tanks comprising zirconium silicate block, over at least one face of said zirconium silicate block a layer of platinum alloy foil, and between said zirconium silicate block and said platinum alloy foil and adhering the block and foil one to the other throughout their mutual extent, a reaction product of said zirconium silicate and alumina.

References Cited in the file of this patent

UNITED STATES PATENTS

| | | |
|---|---|---|
| 461,980 | Miksch | Oct. 27, 1891 |
| 595,485 | Lamb | Dec. 14, 1897 |
| 1,576,021 | Aram | Mar. 9, 1926 |
| 1,934,788 | Bole et al. | Nov. 14, 1933 |
| 2,125,193 | Morlock | July 26, 1938 |
| 2,190,296 | Richardson | Feb. 13, 1940 |
| 2,216,813 | Goldschmidt | Oct. 8, 1940 |
| 2,241,505 | Cuttler | May 13, 1941 |
| 2,276,295 | Ferguson | Mar. 17, 1942 |
| 2,286,903 | Dockerty | June 16, 1942 |
| 2,293,089 | Wainer | Aug. 18, 1942 |
| 2,335,135 | Staelin | Nov. 23, 1943 |
| 2,485,807 | Berthold et al. | Oct. 25, 1949 |
| 2,532,190 | Pirani et al. | Nov. 28, 1950 |
| 2,628,927 | Colbert et al. | Feb. 17, 1953 |
| 2,666,088 | Lincoln | Jan. 12, 1954 |
| 2,713,787 | Rose | July 26, 1955 |